US008539364B2

(12) United States Patent
Hamilton et al.

(10) Patent No.: US 8,539,364 B2
(45) Date of Patent: Sep. 17, 2013

(54) ATTACHING EXTERNAL VIRTUAL UNIVERSES TO AN EXISTING VIRTUAL UNIVERSE

(75) Inventors: Rick A. Hamilton, Charlottesville, VA (US); Paul A. Moskowitz, Yorktown Heights, NY (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 12/046,771

(22) Filed: Mar. 12, 2008

(65) Prior Publication Data

US 2009/0235183 A1  Sep. 17, 2009

(51) Int. Cl.
*G06F 3/048* (2006.01)

(52) U.S. Cl.
USPC .......................................... 715/757; 715/850

(58) Field of Classification Search
USPC ................. 709/201, 217, 219, 245; 715/733, 715/734, 757, 850
See application file for complete search history.

(56) References Cited

U.S. PATENT DOCUMENTS

| | | | | |
|---|---|---|---|---|
| 5,608,850 | A * | 3/1997 | Robertson | 345/427 |
| 5,630,081 | A * | 5/1997 | Rybicki et al. | 715/839 |
| 5,689,669 | A * | 11/1997 | Lynch et al. | 715/848 |
| 6,009,458 | A * | 12/1999 | Hawkins et al. | 709/203 |
| 6,219,045 | B1 * | 4/2001 | Leahy et al. | 715/757 |
| 6,263,363 | B1 | 7/2001 | Rosenblatt et al. | |
| 6,342,907 | B1 | 1/2002 | Petty et al. | |
| 6,784,901 | B1 | 8/2004 | Harvey et al. | |
| 6,806,890 | B2 | 10/2004 | Audleman et al. | |
| 6,944,821 | B1 | 9/2005 | Bates et al. | |
| 7,015,954 | B1 * | 3/2006 | Foote et al. | 348/218.1 |
| 7,031,951 | B2 | 4/2006 | Mancisidor et al. | |
| 7,080,161 | B2 | 7/2006 | Leddy et al. | |
| 7,082,436 | B1 | 7/2006 | Bayiates | |
| 7,099,745 | B2 * | 8/2006 | Ebert | 700/245 |
| 7,148,892 | B2 | 12/2006 | Robertson et al. | |
| 7,216,290 | B2 | 5/2007 | Goldstein et al. | |

(Continued)

FOREIGN PATENT DOCUMENTS

WO  WO 2008040092 A1 *  4/2008

OTHER PUBLICATIONS

Müller et al. Rokkatan: Scaling an RTS Game Design to the Massively Multiplayer Realm. ACM Computers in Entertainment. Jul. 2006, vol. 4 No. 3.*

(Continued)

*Primary Examiner* — Matt Kim
*Assistant Examiner* — Ryan Barrett
(74) *Attorney, Agent, or Firm* — Lisa Ulrich; Robert C. Rolnik

(57) ABSTRACT

The present invention is directed to attaching an external virtual universe to an existing virtual universe. A method for enhancing a preexisting virtual universe (VU) in a computerized system may include providing an external virtual universe in a second computerized system, where the external virtual universe is configured so as to be attachable to the first, preexisting virtual universe. As a result, residents of virtual universes can create, run, and/or host their real estate, inventory items, and/or avatars (including all necessary geometries, textures, scripts, etc.) using their own computing devices, which may be inserted, attached, and detached from the VU grid.

12 Claims, 11 Drawing Sheets

(56) References Cited

U.S. PATENT DOCUMENTS

| | | | |
|---|---|---|---|
| 7,269,632 B2* | 9/2007 | Edeker et al. | 709/217 |
| 7,298,378 B1* | 11/2007 | Hagenbuch et al. | 345/589 |
| 7,990,387 B2* | 8/2011 | Hamilton et al. | 345/473 |
| 2002/0026645 A1 | 2/2002 | Son et al. | |
| 2002/0188678 A1* | 12/2002 | Edecker et al. | 709/204 |
| 2003/0191841 A1 | 10/2003 | DeFerranti et al. | |
| 2004/0143852 A1* | 7/2004 | Meyers | 725/133 |
| 2004/0220850 A1* | 11/2004 | Ferrer et al. | 705/14 |
| 2005/0008240 A1 | 1/2005 | Banerji et al. | |
| 2005/0137015 A1 | 6/2005 | Rogers et al. | |
| 2005/0138042 A1 | 6/2005 | Foo et al. | |
| 2005/0143174 A1* | 6/2005 | Goldman et al. | 463/42 |
| 2006/0031578 A1* | 2/2006 | Pelletier | 709/245 |
| 2006/0154711 A1* | 7/2006 | Ellis et al. | 463/1 |
| 2006/0155667 A1 | 7/2006 | Tolba | |
| 2006/0234795 A1 | 10/2006 | Dhunjishaw et al. | |
| 2006/0287106 A1* | 12/2006 | Jensen | 463/42 |
| 2007/0293319 A1* | 12/2007 | Stamper et al. | 463/42 |
| 2007/0294171 A1* | 12/2007 | Sprunk | 705/50 |
| 2008/0168548 A1* | 7/2008 | O'Brien | 726/9 |
| 2008/0204449 A1* | 8/2008 | Dawson et al. | 345/419 |
| 2008/0235320 A1* | 9/2008 | Joy et al. | 709/201 |
| 2008/0249987 A1* | 10/2008 | Ogasawara | 707/3 |
| 2008/0252637 A1* | 10/2008 | Berndt et al. | 345/419 |
| 2008/0268418 A1* | 10/2008 | Tashner et al. | 434/365 |
| 2009/0066690 A1* | 3/2009 | Harrison | 345/419 |
| 2009/0089157 A1* | 4/2009 | Narayanan | 705/14 |
| 2009/0112970 A1* | 4/2009 | Dawson et al. | 709/202 |
| 2009/0235191 A1* | 9/2009 | Garbow et al. | 715/764 |

OTHER PUBLICATIONS

Barrus et al. Locales: Supporting Large Multiuser Virtual Environments. IEEE Computer Graphics and Applications. Nov. 1996.*

Hemp. Avatar-Based Marketing. Harvard Business Review. Jun. 2006.*

Nancy Yen-Wen Cheng, Connecting Virtual Worlds: paradigms for on-line transitions, Submission for ACSA Technology Conference 1999.*

Benjamin Lam, Portal Walkthrough, Oct. 12, 2007, http://www.gamefaqs.com/pc/934386-portal/faqs/50434.*

Kawulok, L.; Trusted Group Membership for JXTA; Article; V3938; May 12, 2004; 218-225; Springer-Verlag; Berlin/Heidelberg, Germany.

Collins, J.; Final Office Action; Dec. 22, 2009; U.S. Appl. No. 11/833,426; USPTO.

Business Week; My Virutal Life; Magazine; May 1, 2006; http://www.businessweek.com/print/magazine/content/O6_18/b39820.

Wikipedia; Machine Readable; Internet website; Aug. 30, 2007 (page last modified date); http://en.wikipedia.org/wiki/machine_readable.

IBM; Grid Explained; Whitepaper; Jan. 2005; ftp://ftp.software.ibm.com/common/ssi/rep_wh/n/RWOO9OOUSEN/GRW00900USEN.pdf.

Brain; How Web Servers Work; Internet website; Sep. 17, 2007 (page download date); http://www.howstuffworks.com/web-server.htrn/printable.

McKenna; How Virtual Computing Works; Internet website; Sep. 17, 2007 (page download date); http//:www.howstuffworks.how-virtual-computing-works.

Wikipedia; Machine-readable Medium; Internet website; Jun. 14, 2006 (page last modified date); http://en.wikipedia.org/wiki/Machine-readable-medium.

Tyson; How Virtual Private Networks Work; Internet website; Sep. 17, 2007 (page download date); http://computer.howstuffworks.com/asp.htm/printable.

Qarchive; Stitching; Internet website; Nov. 19, 2007 (page download date); http://stitching.qarchive.org.

Fosner; OpenGL Programming for Windows 95 and Windows NT; Oct. 1996; Addison-Wesley.

Muller et al.; Rokkatan: Scaling an RTS Game Design to the Massively Multiplayer Realm; vol. 4 No. 3; Jul. 2006; ACM Computers in Entertainment.

Collins, J.; Office Action 1; Aug. 11, 2009; U.S. Appl. No. 11/833,426; USPTO.

Pham, Hung Q.; Non-Final Office Action; Date: Jun. 22, 2010; U.S. Appl. No. 12/026,045; USPTO.

Linden Research, Inc.; Second Life; Date: 2007; URL: http://web.archive.org/web/20071231233917/http://secondlife.com.

Jennings, Erin; A Basic Guide to Second Life; pp. 1-18; Date: 2007; The University of Texas at Dallas School of Management.

Vu, Thanh T; Non-Final Office Action; Dated: Oct. 26, 2010; U.S. Appl. No. 11/936,900; USPTO.

Collins, Joshua L; Examiner's Answer to Appeal Brief; Dated Sep. 17, 2010; U.S. Appl. No. 11/833,426; USPTO.

Pham, Hung Q.; Notice of Allowance and Fees Due; Nov. 24, 2010; U.S. Appl. No. 12/026,045; USPTO.

Rolnik, Robert C; Reply Brief; Dated Nov. 16, 2010; U.S. Appl. No. 11/833,426; USPTO.

Vu, Thanh T; Final Office Action; Dated: Mar. 22, 2011; U.S. Appl. No. 11/936,900; USPTO.

Pham, Hung Q; Notice of Allowance; dated Nov. 24, 2010; U.S. Appl. No. 12/026,045.

Vu, Thanh T; Response to Office Action; Dated: Dec. 22, 2010; U.S. Appl. No. 11/936,900; USPTO.

Pham, Hung Q; Notice of Allowance; dated May 10, 2011; U.S. Appl. No. 13/006,201; USPTO.

Vu, Thanh T; Office Action; Dated: Jul. 5, 2011; U.S. Appl. No. 11/936,900; USPTO.

Rolnik, Robert C; Response to Office Action; dated Oct. 4, 2011; U.S. Appl. No. 11/936,900; USPTO.

Vu, Thanh; Notice of Allowance; dated Dec. 2, 2011; U.S. Appl. No. 11/936,900; USPTO.

Rolnik, Robert C; Request for Continued Examination; Dated: Jun. 9, 2011; U.S. Appl. No. 11/936,900; USPTO.

* cited by examiner

ATTACHING EXTERNAL VIRTUAL UNIVERSES TO AN EXISTING VIRTUAL UNIVERSE

FIELD OF THE INVENTION

The present invention relates generally to improving the virtual universe experience, and more specifically relates to attaching an external universe to an existing virtual universe.

BACKGROUND OF THE INVENTION

A virtual environment is an interactive simulated environment accessed by multiple users through an online interface. Users inhabit and interact in the virtual environment via avatars, which are two or three-dimensional graphical representations of humanoids. There are many different types of virtual environments, however there are several features many virtual environments generally have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual environments (e.g., universes, worlds, etc.), such as that provided in the on-line world Second Life (Second Life is a trademark of Linden Research in the United States, other countries, or both). The Second Life client program provides its users (referred to as residents) with tools to view, navigate, and modify the Second Life world and participate in its virtual economy.

Second Life and other on-line virtual environments present a tremendous new outlet for both structured and unstructured virtual collaboration, gaming, exploration, commerce, and travel, as well as real-life simulations in virtual spaces. Virtual universes, such as Second Life, typically are run on a group of servers owned by the company that provides the virtual universe. As such, the computational and bandwidth load is very high so that the server machines become overloaded and poor performance results, e.g., time dilation. Poor performance may take the form of slow rendering and slow movement; or, the virtual universe simply "hanging," which may force the user to leave the virtual universe.

With the increasing use of the virtual universe by an ever increasing number of avatars these performance issues are exacerbated. As one example of the challenge to users of a virtual universe, is the situation where a popular piece of land (e.g., casino) may be built near an existing homeowner and/or business property, thereby causing the homeowner and/or business property owner to suffer tremendously due to the aforementioned reduction of performance on their land (or being unable to access their land entirely) because computing and bandwidth resources are being used by the casino and its greater quantity of avatars and assets.

SUMMARY OF THE INVENTION

The present invention is directed to attaching an external universe to an existing virtual universe.

A first aspect of the present invention is directed to a method for enhancing a preexisting virtual universe in a first computerized system, comprising: providing an external virtual universe in a second computerized system, wherein the external virtual universe is configured to be attachable to the preexisting virtual universe in the first computerized system.

A second aspect of the present invention is directed to a system for enhancing a preexisting virtual universe in a first computerized system, comprising: a system for providing an external virtual universe in a second computerized system, wherein the external virtual universe is configured to be attachable to the preexisting virtual universe in the first computerized system.

A third aspect of the present invention is directed to a program product stored on a computer readable medium, which when executed, provides for enhancing a preexisting virtual universe in a first computerized system, the computer readable medium comprising program code for: providing an external virtual universe in a second computerized system, wherein the external virtual universe is configured to be attachable to the preexisting virtual universe in the first computerized system.

A fourth aspect of the present invention is directed to a method for deploying an application for enhancing a preexisting virtual universe in a first computerized system, comprising: providing a computer infrastructure being operable to: provide an external virtual universe in a second computerized system, wherein the external virtual universe is configured to be attachable to the preexisting virtual universe in the first computerized system.

A fifth aspect of the present invention is directed to a business method for enhancing a preexisting virtual universe in a first computerized system, the business method comprising: managing a network that includes at least one computer system that performs the process described herein; and receiving payment based on the managing.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
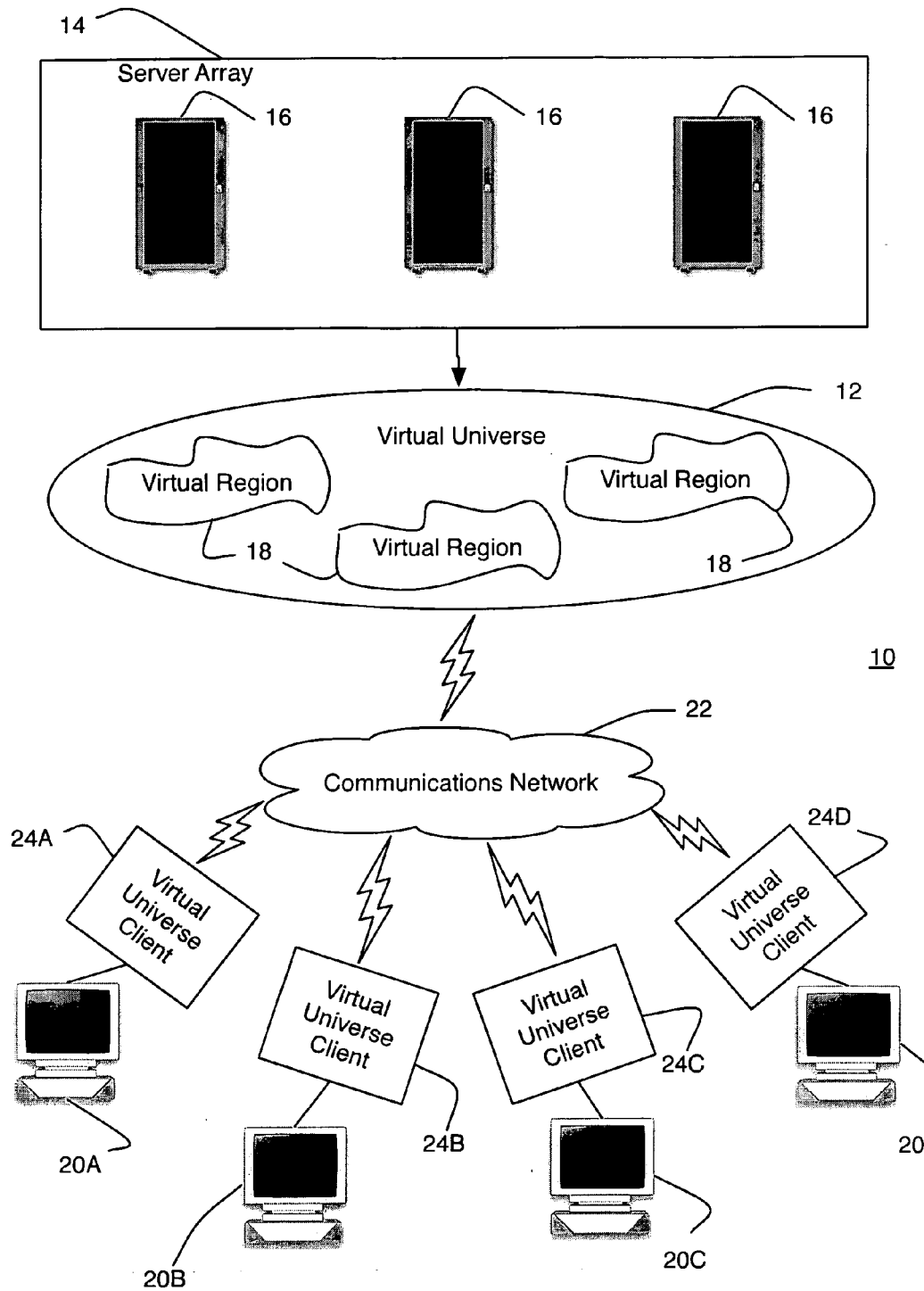
FIG. 1 depicts a high-level schematic diagram showing a networking environment for providing a virtual universe in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention provides for attaching an external universe to an existing virtual universe (VU). Aspects of the invention provide a system, program product stored on a computer readable medium, and method to in which residents of virtual universes can create, run, and/or host their real estate, inventory items, and/or avatars (including all necessary geometries, textures, scripts, etc.) using their own computing devices, which may be inserted, attached, and detached from the VU grid. The methodology offers several benefits to both resident/users and to VU grid owners. The methodology can aid users by including greater control over their own component worlds and more responsive interactions when rendering and interacting with their own and/or visiting avatar(s), assets, and/or real estate. The methodology may also provide the ability to interact with their component worlds and queue up messages for delivery when the VU is attached, even while in an "offline" state; to also interact between individual external VU's; and, the ability to throttle up frame rates and graphical detail while in their own component world. Under aspects of the present invention, the definition of a virtual universe includes not only that discussed above, but also is meant to include a social networking site such as Facebook, MySpace, and/or the like. Facebook and MySpace are trademarks in the United States and/or in other countries.

FIG. 1 shows a high-level schematic diagram showing a networking environment 10 for providing a virtual universe 12 according to one embodiment of this invention in which a service for attaching an external universe to an existing universe 12 can be utilized. As shown in FIG. 1, the networking environment 10 comprises a server array or grid 14 comprising a plurality of servers 16 each responsible for managing a portion of virtual real estate within the virtual universe 12. A virtual universe provided by a typical massive multiplayer on-line game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20 (e.g., 20A, 20B, 20C, 20D) interact with the virtual universe 12 through a communication network 22 via a virtual universe client 24 (e.g., 24A, 24B, 24C, 24D) that resides in the computer. Below are further details of the virtual universe 12, server array 14, and virtual universe client 24.

Figure 2:
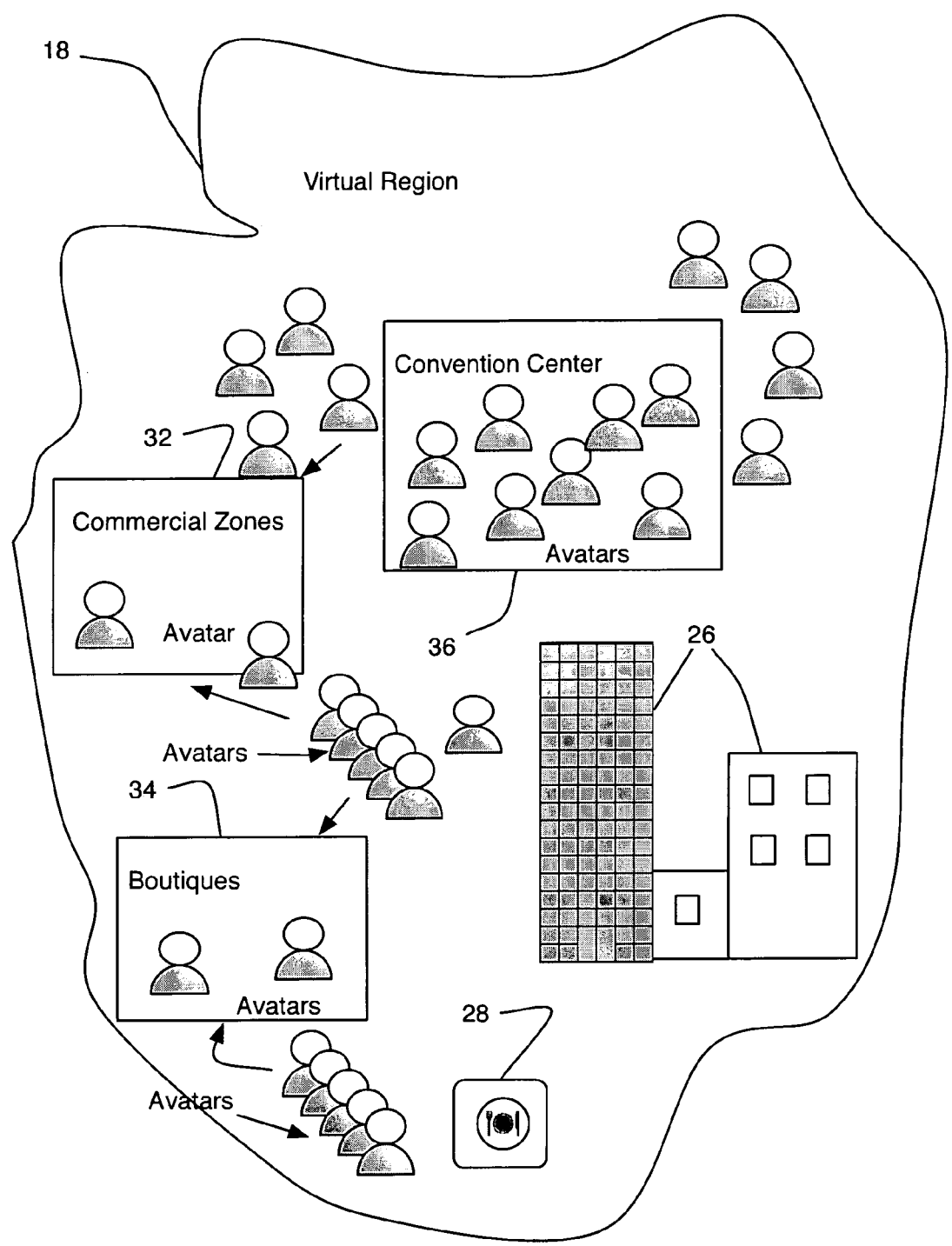
FIG. 2 depicts a more detailed view of a virtual region shown in the virtual universe of FIG. 1 in accordance with an embodiment of the present invention.

FIG. 2 shows a more detailed view of a virtual region shown 18 in the virtual universe 12 of FIG. 1 with avatars concentrated in various locations of the virtual region. As an example, the virtual region 18 shown in FIG. 2 comprises a downtown office center 26, restaurants 28 commercial zones 32 and boutiques 34 for shopping and a convention center 36 for meetings and various conventions. Also located in the virtual region 18 may be a downtown office center 26, restaurants 28 commercial zones 32 and boutiques 34, convention center 36, etc. These examples of items in the virtual region 18 shown in FIG. 2 are only illustrative of some things that may be found in a virtual region 18 and those skilled in the art will recognize that these regions can have many more items that can be found in a real-life universe as well as things that do not presently exist in real life.

Residents or avatars which as mentioned above are personas or representations of the users of the virtual universe, roam all about the virtual region by walking, driving, flying or even by teleportation or transportation which is essentially moving through space from one point to another, more or less instantaneously. As shown in FIG. 2, there is a concentration of avatars in or near the convention center 36, and there are a several avatars at or near the commercial zones 32 and at the boutiques 34 and none at the downtown office center 26 and restaurants 28. Several avatars and/or a group of avatars are queued up to enter the commercial zone 32 and/or the boutiques 34. Amongst other items, the large quantity of avatars gathered, for example, in and/or near the convention center 36 may cause the aforementioned "bogging down" for user/residents and their respective avatars that may traverse nearby. In any event, aspects of the method will allow attachment of an external virtual universe to the virtual universe 12 to address this and/or other shortcomings.

Figure 3:
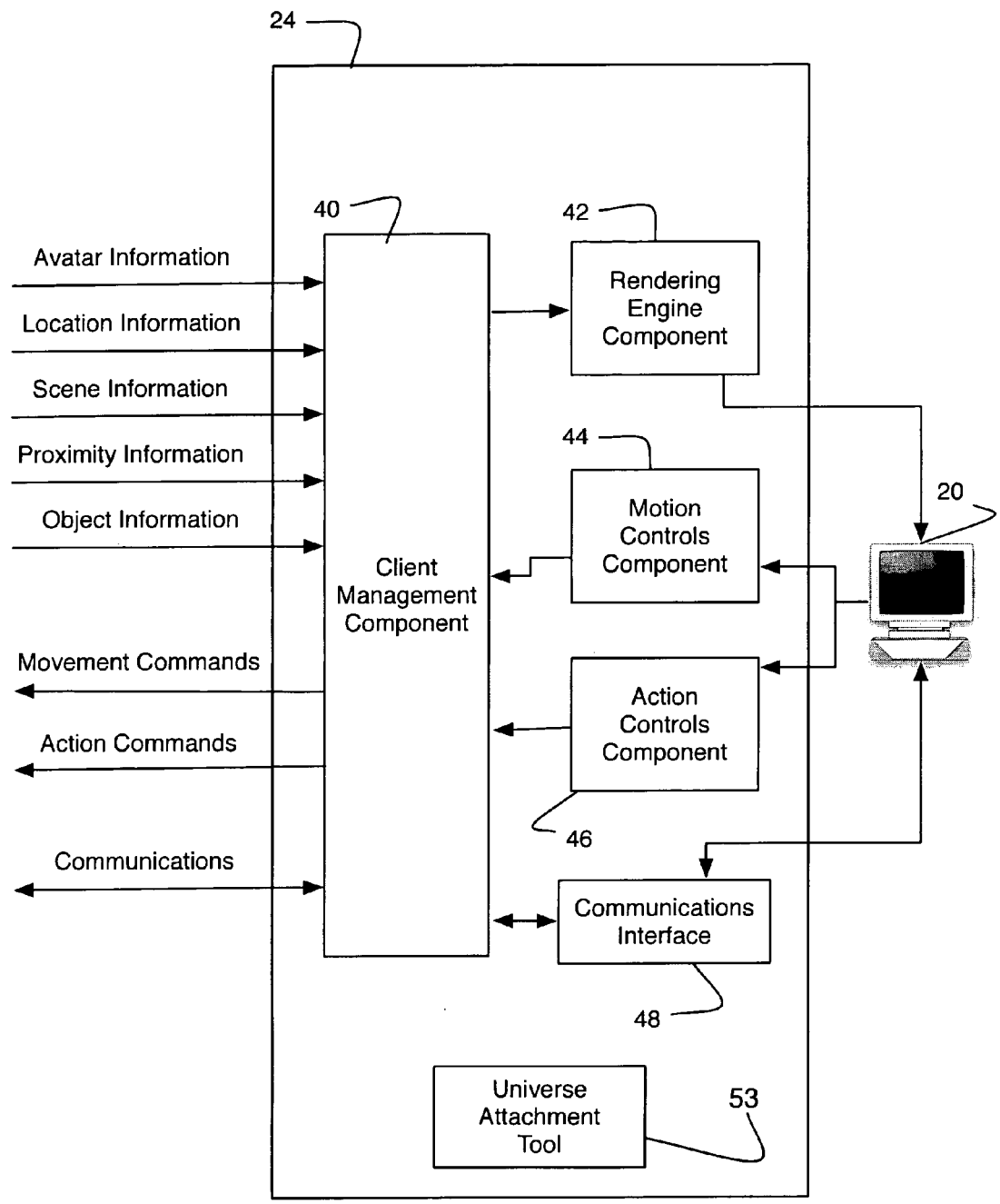
FIG. 3 depicts a more detailed view of the virtual universe client shown in FIG. 1 in accordance with an embodiment of the present invention.

FIG. 3 shows a more detailed view of the virtual universe client 24 shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc.

An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and email.

FIG. 3 shows various information that may be received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or island he or she is in) as well as scene information (e.g., what the avatar sees). The client management component 40 also receives proximity information which contains information on what the user's avatar is near and object information which is information that can be obtained by one's senses (e.g., touch, taste, smell, etc.,) and what actions are possible for nearby objects (e.g., postures, movements). FIG. 3 also shows the movement commands and action commands that are generated by the user that are sent to the server array via the client management component 40, as well as the communications that can be sent to the users of other avatars within the virtual universe.

Figure 4:
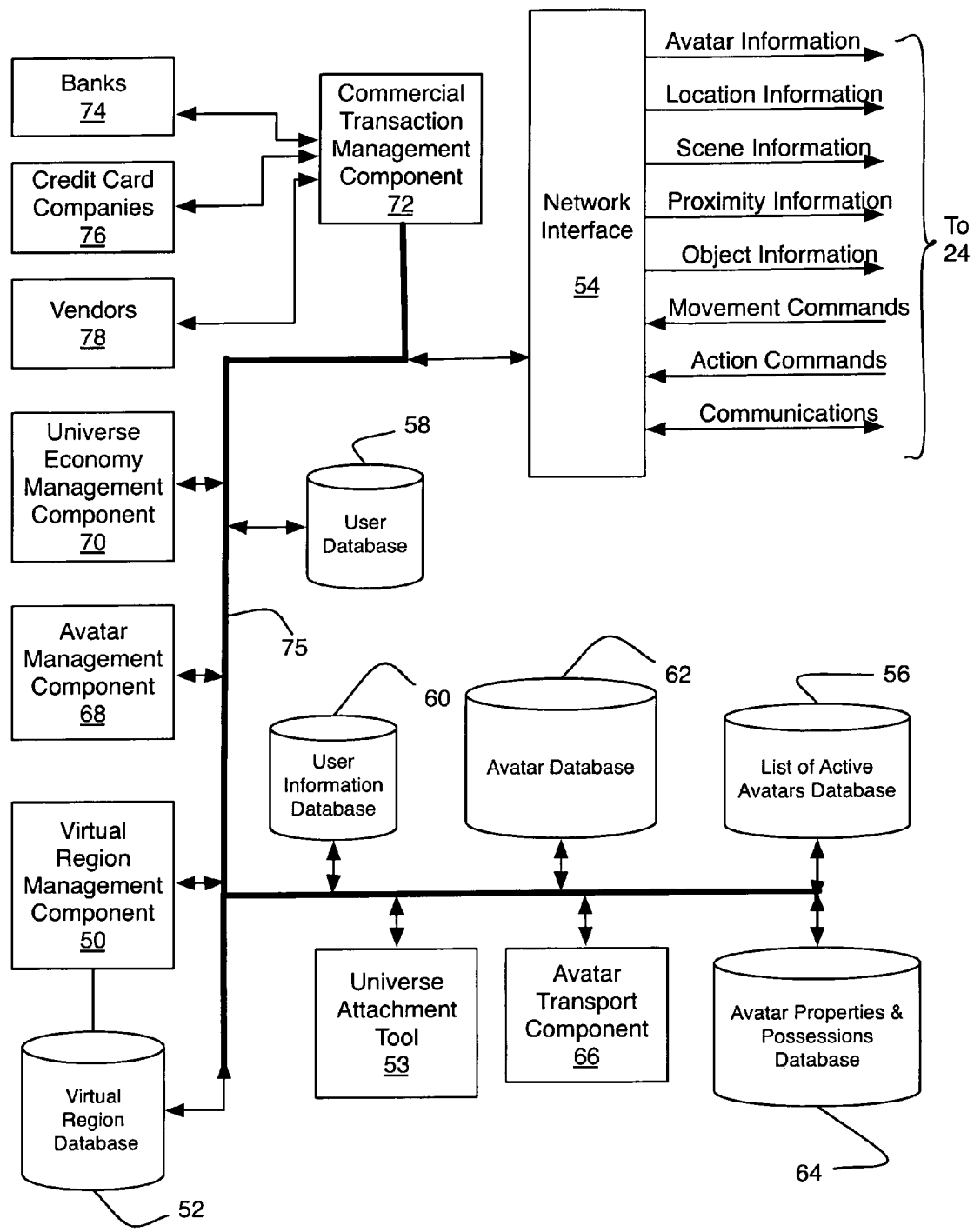
FIG. 4 depicts a more detailed view of some of the functionalities provided by the server array shown in FIG. 1 in accordance with an embodiment of the present invention.

FIG. 4 shows a more detailed view of some of the functionalities provided by the server array 14 shown in FIG. 1. In particular, FIG. 4 shows a virtual region management component 50 that manages a virtual region within the virtual universe. In particular, the virtual region management component 50 manages what happens in a particular region such as the type of landscape in that region, the amount of homes, commercial zones, boutiques, bridges, highways, streets, parks, restaurants, etc. A virtual region database 52 stores information on all of the items in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

Figure 6A:
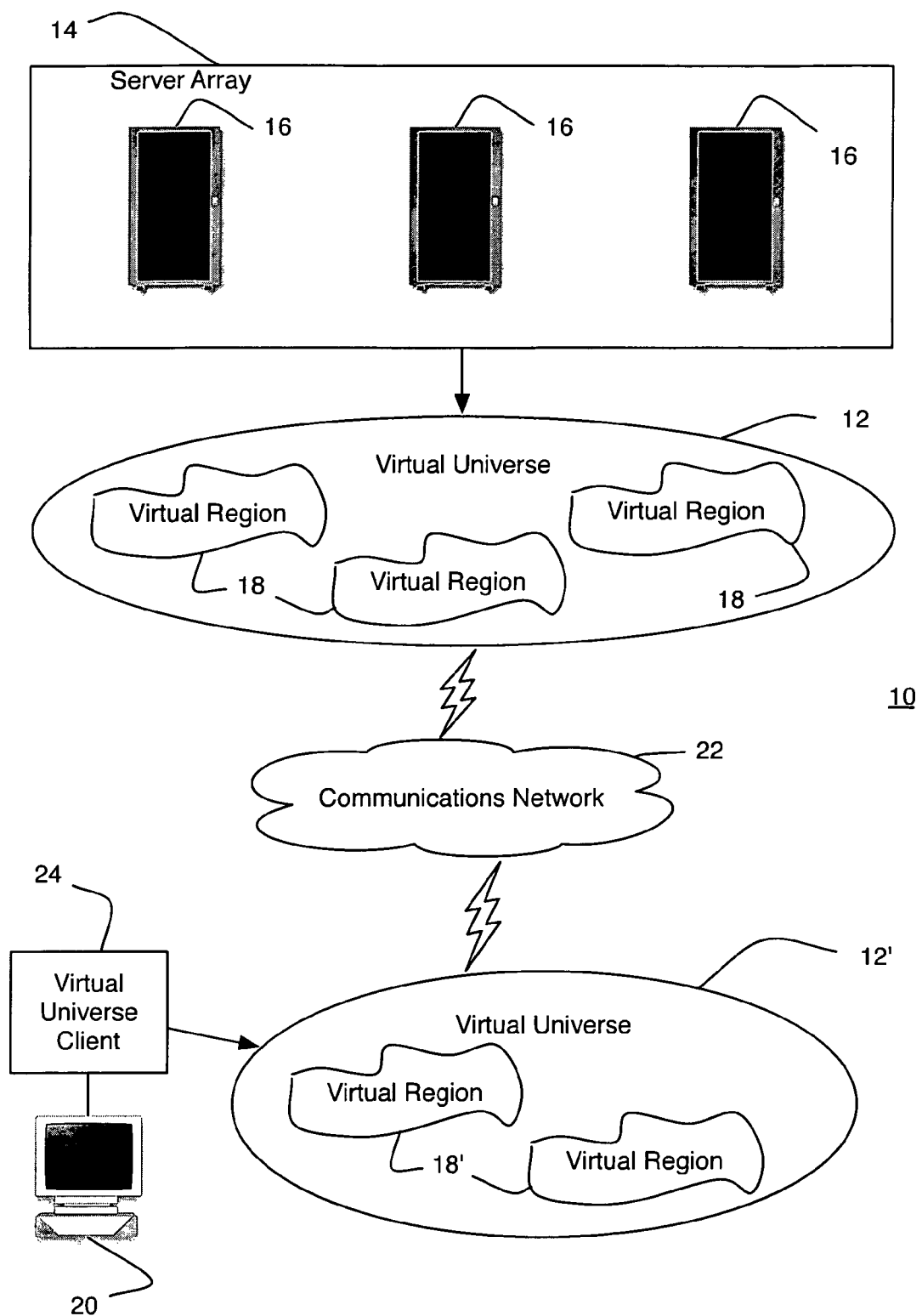
FIG. 6A depicts a high-level schematic diagram showing a networking environment for attaching an external virtual universe in accordance with an embodiment of the present invention.
Figure 6B:
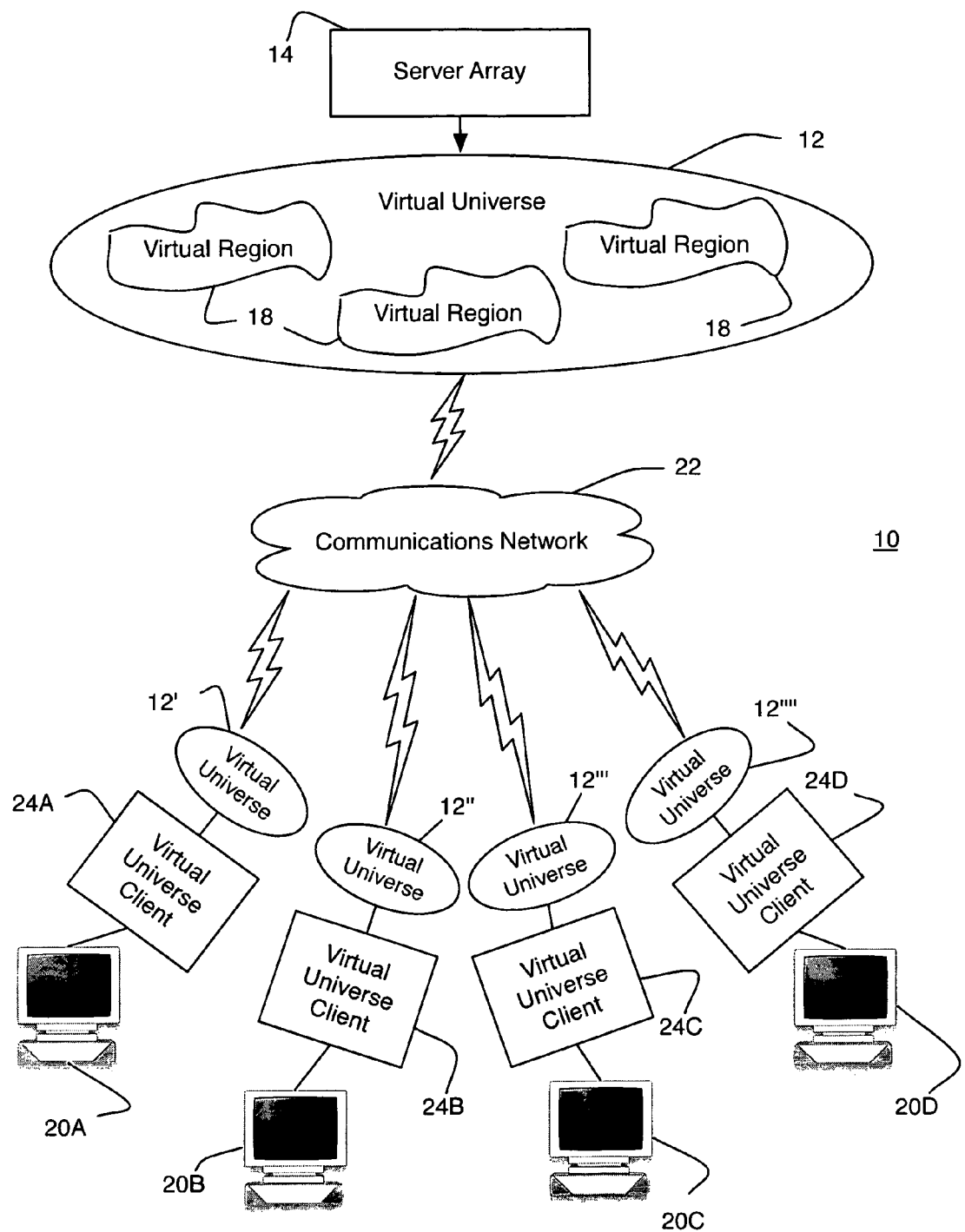
FIG. 6B depicts a high-level schematic diagram showing a networking environment for attaching a plurality of external virtual universes in accordance with another embodiment of the present invention.

A universe attachment tool 53 provides for the attachment (and detachment) of an external universe to an existing virtual universe 12 (see FIGS. 6A, 6B). Below is a more detailed discussion of the universe attachment tool 53 and how it provides for the attachment (and detachment) of an external virtual universe to an existing virtual universe 12 (see FIGS. 6A, 6B), including a discussion on how the tool 53 provides an external virtual universe 12' (see FIGS. 6A, 6B) in a first computerized system 20 (FIGS. 6A, 6B); and attaching the external virtual universe 12' to a preexisting virtual universe 12 in a second computerized system 14.

FIG. 4 shows a network interface 54 that enables the server array 14 to interact with the virtual universe client 24 residing on computer 20. In particular, the network interface 54 communicates information that includes information pertaining to avatars, location, trajectory, scene, proximity and objects to the user through the virtual universe client 24 and receives movement and action commands as well as communications from the user via the universe client.

As shown in FIG. 4, there are several different databases for storing information. In particular, database 56 contains a list of all the avatars that are on-line in the virtual universe 12. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the users that reside in the virtual universe 12. In one embodiment, database 62 contains information such as all of the avatars that a user may have, the profile of each avatar, avatar characteristics (e.g., appearance, voice and movement features), while database 64 contains an inventory listing properties and possessions that each avatar owns such as houses, cars, sporting equipment, appearance, attire, etc. Those skilled in the art will recognize that databases 58-64 may contain additional information if desired. Although the above information is shown in FIG. 4 as being stored in databases, those skilled in the art will recognize that other means of storing information can be utilized.

An avatar transport component 66 enables individual avatars to transport, which as mentioned above, allows avatars to transport through space from one point to another point, instantaneously. For example, avatars could teleport to an art exhibit held in a museum held in Greenland.

An avatar management component 68 keeps track of what on-line avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78 to facilitate such a transaction.

The components in FIG. 4 are all interconnected via an interconnect 75. Although shown in FIG. 4 as connected via interconnect 75, all the components may be configured to interact with each other using other means now known or later developed. The components that are shown as being interconnected via interconnect 75 are illustrated in that manner to convey the close interactions that exist between these components such as the banks 74, credit card companies 76, and vendors with the commercial transaction management component 72.

Figure 5:
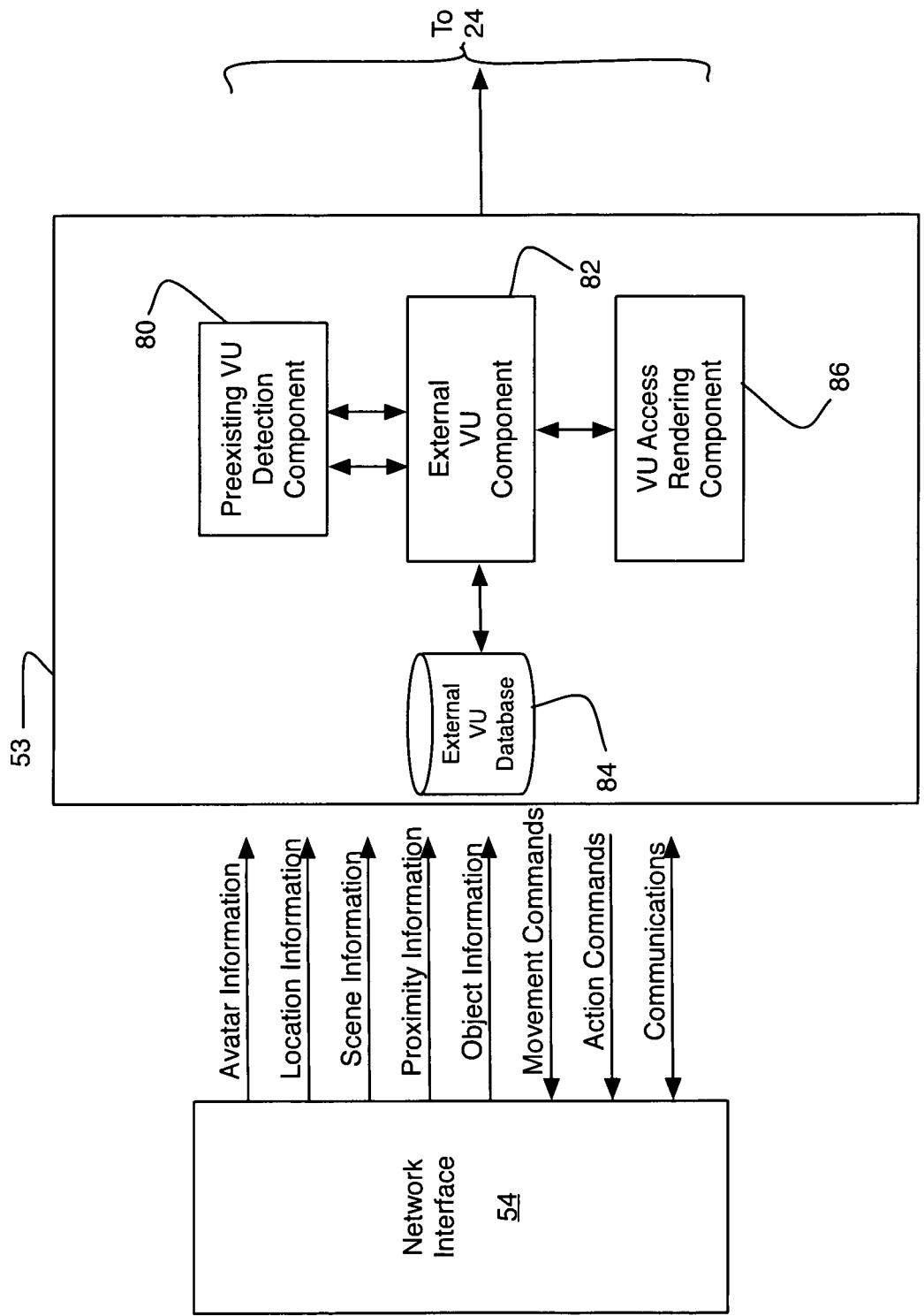
FIG. 5 depicts a more detailed view of a universe attachment tool in FIG. 4 in accordance with an embodiment of the present invention.

FIG. 5 shows a more detailed view of a universe attachment tool 53 shown in FIG. 4 according to one embodiment of this disclosure. As mentioned above, the user universe attachment tool 53 provides for the attachment (and detachment) of an external universe to an existing virtual universe 12. As shown in FIG. 5, in one embodiment, the universe attachment tool 53 resides on a user's computer system 24 and communicates directly to the virtual universe 12 that is a part of the server array 14 and its residents via the virtual universe client 24.

The universe attachment tool 53 may comprise a preexisting VU detection component 80; an external VU component 82; and, a VU access rendering component 86. In an embodiment the external VU component 82 may provide the external VU in a second computerized system (e.g., personal computer), wherein the external VU is configured to be attachable to the preexisting VU 12. The preexisting VU detection component 80 may detect a location of the preexisting VU 12 so that the external VU may readily attach and/or detach thereto/from. The VU access rendering component 86 may render an access to the external VU in a graphical user interface (GUI) located at, for example, the computerized system 20 of the user.

The External VU database 84 coupled to the External VU component 82 may contain data such as information as to access renderings, location of the attachment to the preexisting VU 12, and/or the like.

Embodiments of the present invention allow for a resident of an existing virtual universe 12 (e.g., VU grid) to create, attach, run, and/or detach their virtual universe from the VU grid 12. The resident may have, for example, the ability to add a new portion of a virtual world (e.g., an external virtual universe), such as an island with a home and avatar, to an overall VU grid 12 without requiring reconfiguration or manual installation of CPU cores and the VU grid region that are hosted on such CPU cores. For illustrative purposes, some of these capabilities will be termed herein, as "Plug and Play" (PnP). Thus, an embodiment of a PnP-capable VU may include the capability of the VU grid to be PnP-compatible; the component world to be interfaced would be a PnP-compatible VU "addition"; and, the PnP-compatible VU grid may have the ability to recognize changes to its configuration when external virtual universes are attached and/or detached.

Turning to FIG. 6A, for example, an external virtual universe 12' (e.g., component world) can be created by the virtual universe client 24 and attached to an existing virtual universe 12. In order to create the external virtual universe 12', a component world Universal Unique Identifier (UUID) is created, in order to assist in ensuring the particular component world is kept distinct from other components worlds. For example, as the embodiment in FIG. 6B depicts any number of external virtual universes (e.g., 12', 12", 12''', 12'''') may be created by their respective virtual universe clients 24 for subsequent attachment (and detachment) to an existing virtual universe 12. Creating the external virtual universe 12' (e.g., component world) may further comprise assigning boundary coordinates of the external virtual universe 12' to coordinates within a virtual universe 12 (and/or virtual region 18) so as to carve out virtual space where the component world will visually and logically be arranged in relation to other region(s) 18 and other component worlds 12", 12''', 12''''. Creating the component world 12' may further comprise transfer, installation, and configuration of software to control and operate the component world 12' to the user's local machine 20 and/or virtual universe client 24, thereby allowing either an offline and/or a attached state of operation of the component world 12'. Transfer may further comprise, for example, network mechanism to download, throttle bandwidth, selecting a temporary location of files, confirming that the downloading succeeded, and/or the like. Similarly, installation may further comprise, for example, determining an install location, registration of an OS, creation of shortcuts, and/or the like. Configuration may further comprise configuring the settings for connecting to the VU grid, determining optimal settings for visual, machine, and/or network performance, establishing privacy and security controls, and/or the like. Creation of the component world 12' may further comprise application of rules from the VU grid 12 to component world 12', such as entitlement of component world size, virtual money, assets, avatars, number of textures, limits on scripts, and/or the like. In this manner, a seamless interface between the created external virtual universe 12' and the existing virtual universe 12 is created.

In an embodiment of the present invention, the external virtual universe 12' may be attached to an existing virtual universe 12 (e.g., VU grid). Upon and/or prior to attachment, or reattachment, of the external VU 12' to the VU grid 12, the UUID of the external virtual universe 12' is verified for registration via an authentication mechanism. The external VU's 12' database (e.g., external VU database 84 at FIG. 5) is synchronized. The synchronization may include all or a subset of the data depending on, for example, whether the VU grid 12 will be supplying rendering data to others, or if all the data will be queried from the user's machine 20. Attaching may further comprise verifying that any data of external VU 12' adheres to the business logic of the VU grid 12. Upon attaching, any transactions queued while offline (e.g., debiting or crediting the user's or other user's accounts) are performed. Attaching may further comprise removing form the VU grid 12' any indicia (e.g., temporary graphic markers) there were communicating that the component world was detached.

An embodiment of the present invent allows for the detachment of an external VU 12' from the existing virtual universe 12. Detachment may include the VU grid 12 receiving a request to detach. The request may be upon a request from another method, from the user, and/or from an action occurring. The action may, for example, include the VU grid 12 discovering that the network connection to the machine 20 that the external VU 12' resides on has been severed, timed out, and/or is causing performance or other problems on the VU grid 12. Detachment may comprise the VU grid 12 teleporting (changes coordinates) any non-component world avatars and/or assets, such as to outside the entrance of the component world 12'. The VU grid 12 establishes visual queues of the detached external VU 12'. For example, an "under construction" or a "be back soon" sign may be rendered. In an embodiment, the user is given a choice of type and content of graphic display. For example, a status message may be selected and displayed such as "will be back at 2:30 pm US Central time." The VU grid 12 may release any temporarily synchronized data that is holding while the external VU 12' was attached. In this manner, any quantity of attached external VU's 12' may be detached.

In an embodiment, the external VU 12' may further be modified. A modification mode may be entered by the user. For example, if the external VU 12' is attached to the VU grid 12, a message may be sent to the VU grid 12 requesting modification mode. In reply, the VU grid 12 may synchronize any updated modification business logic to the external VU's 12 software (e.g., universe attachment tool 53). If the VU grid 12 disallows active modification, the VU grid 12 may initiate the detachment method discussed herein. The universe attachment tool 53 may initiate an interface(s) to allow edits. The edits may be similar in appearance and behavior to modifications allowed with the virtual universe 12. A difference is that the business logic for modification parameters can be distributed to the local software (e.g., universe attachment tool 53). Another difference may include the user having extra options, such as to include textures and/or other objects that will be display only locally or from machines located physically on the user's LAN (for personal graphical performance enhancements that otherwise would hinder network performance if distributed across a WAN). Before any modifications are saved, the modifications may be parsed via business logic. Further, if the external VU 12' is connected to the VU grid 12, then the modifications of the external VU 12' are synchronized with the VU grid 12. In another embodiment, if the external VU 12' is detached when modifications are requested, the attachment method disclosed herein may be initiated.

In this manner, embodiments of the invention may help reduce infrastructure requirements and/or costs due to further distributed processing. Each resident's attached component world (e.g., attached virtual universe) may be a separate CPU core, with intra-core processing having no drain on the larger VU grid. Embodiments may also offer more responsiveness and/or reliable database(s) due to more data being stored in distributed database(s). These performance enhancements can reduce the current scalability problems of virtual universes.

Figure 7:
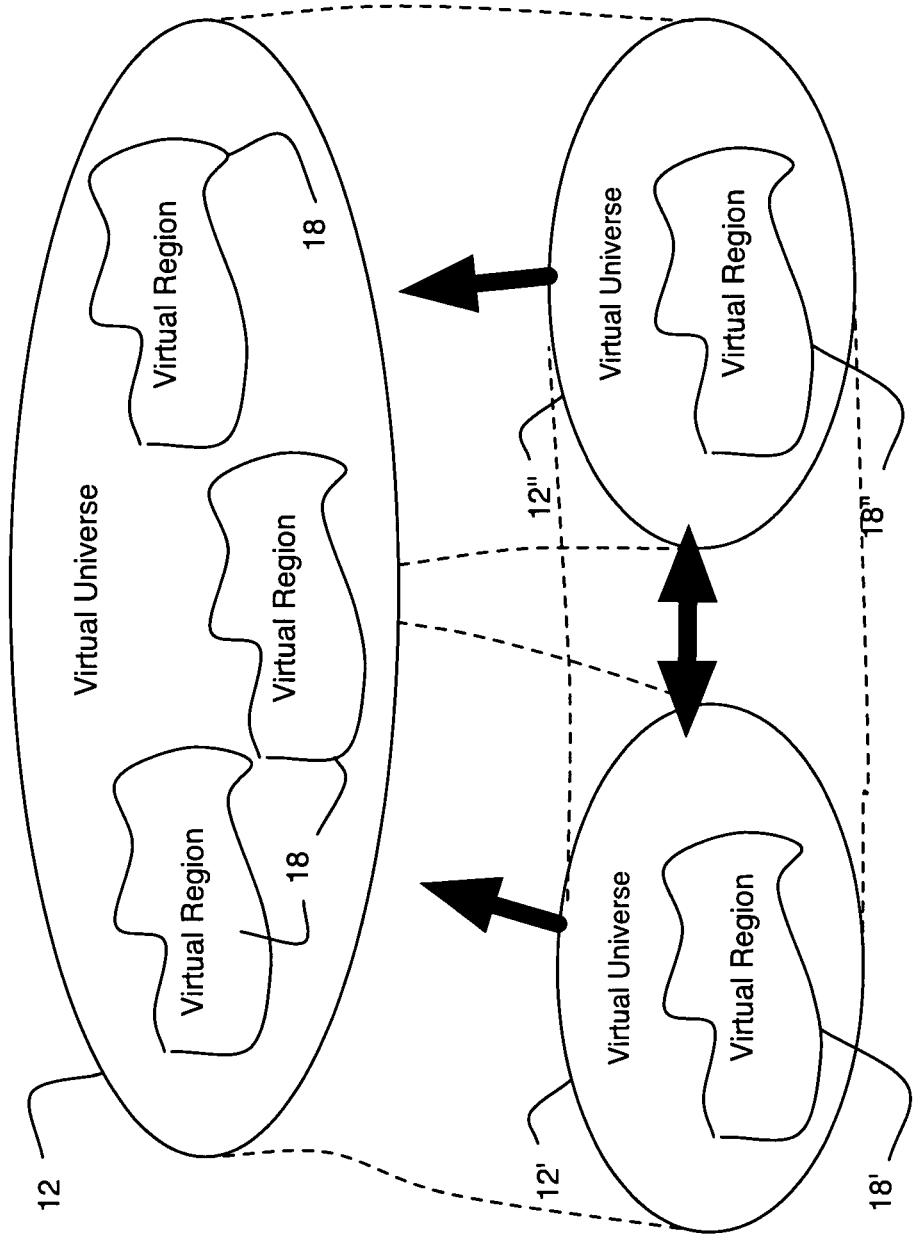
FIG. 7 depicts a close up schematic diagram showing multiple external virtual universes attaching to an existing virtual universe in accordance with an embodiment of the present invention.
Figure 8:
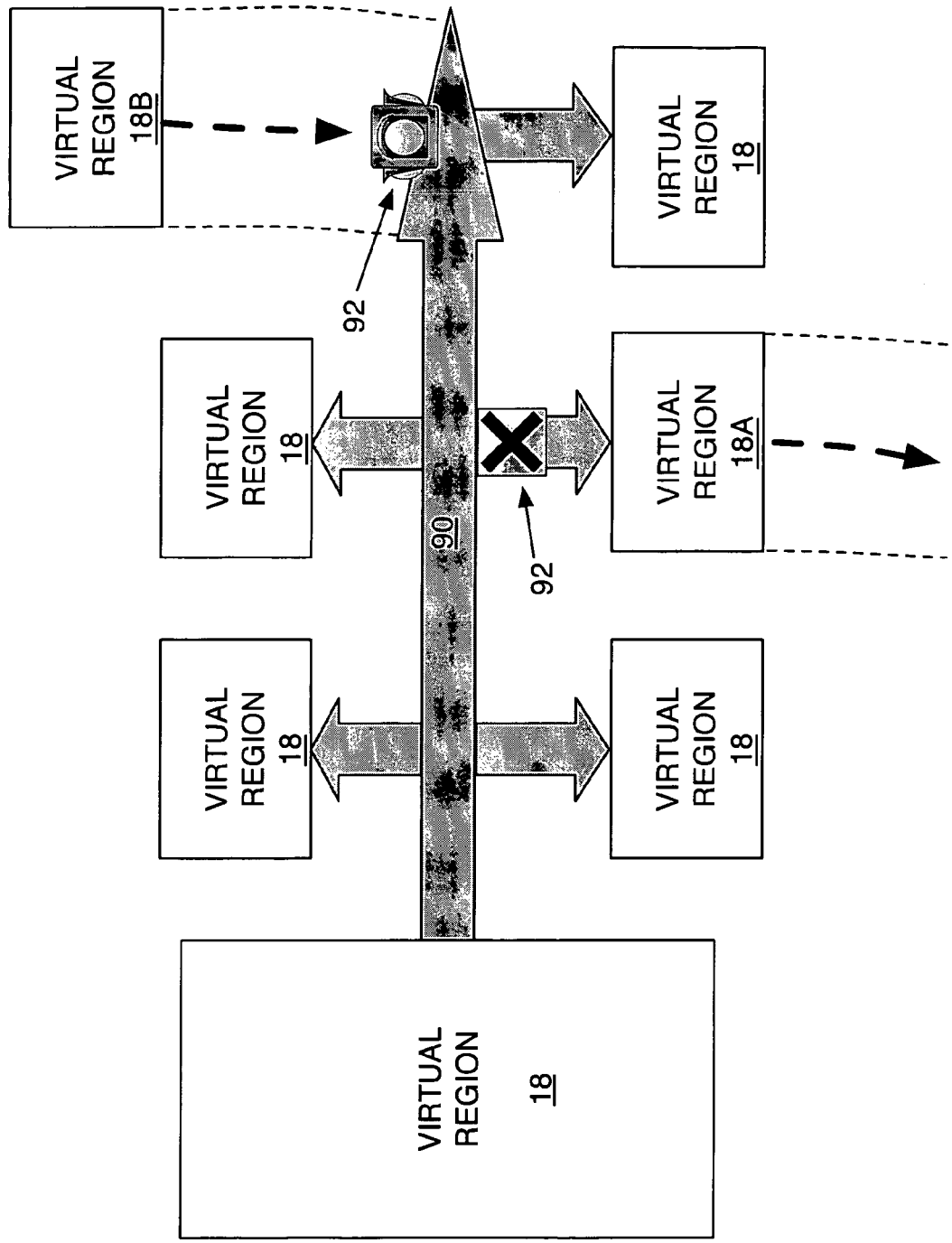
FIG. 8 depicts a schematic diagram showing multiple external virtual universes in various stages of attachment and detachment to an existing virtual universe in accordance with another embodiment of the present invention.
Figure 9:
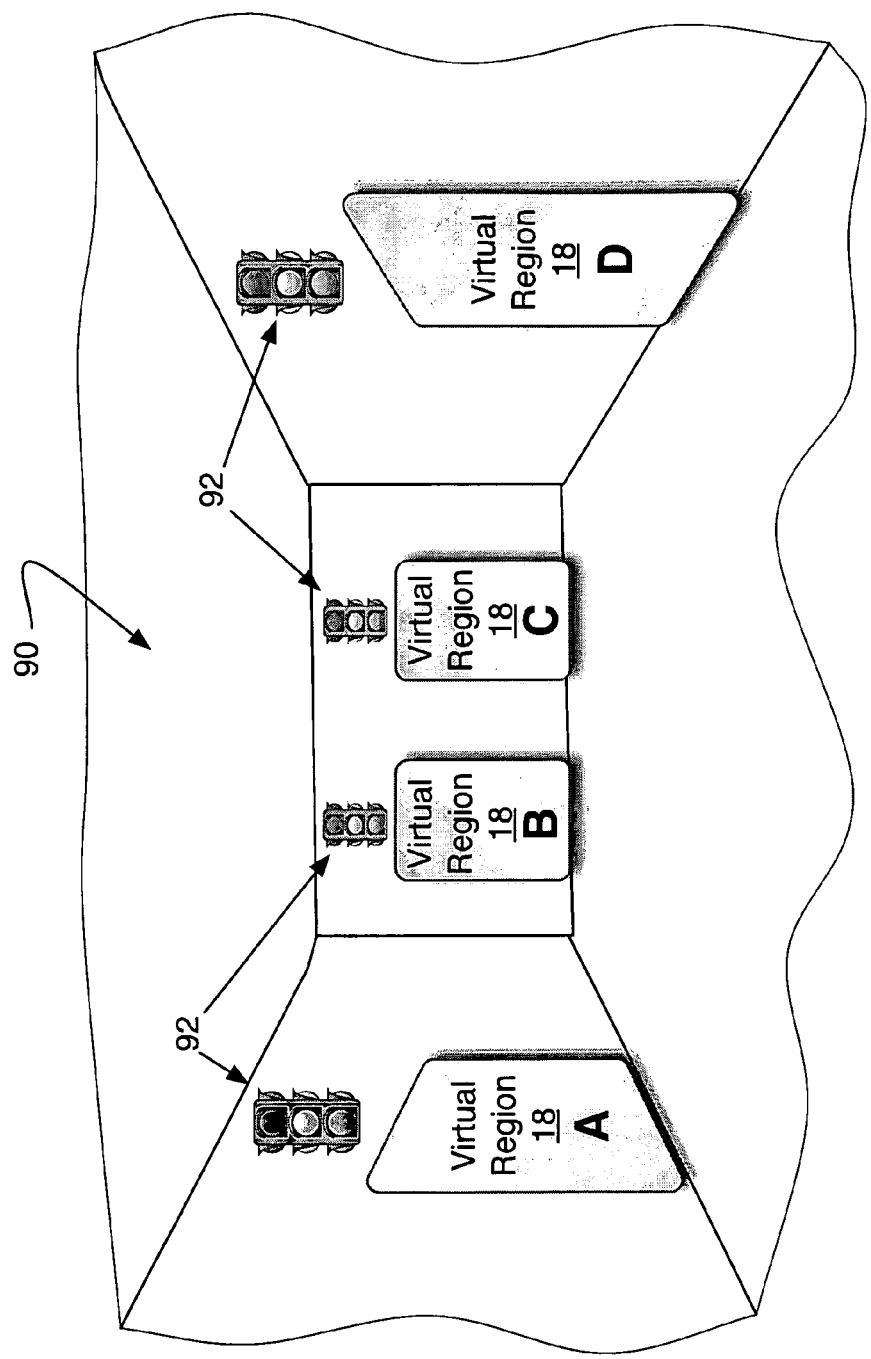
FIG. 9 depicts a rendering of a perspective view in a virtual universe of the attachment means to various external universes in accordance with an embodiment of the present invention.

In another embodiment, there may be a peer-to-peer (e.g., two or more personal computers connected) implementation wherein two or more local component worlds (e.g., 12', 12") can attach to each other (see FIG. 6B) regardless of whether or not either local component world (12', 12") are attached to the preexisting virtual universe 12. For example, a first external virtual world 12' residing on a first virtual universe client 24A on a first user operating computer 20A may attach to a second external virtual world 12" residing on a second virtual universe client 24B on a second user operating computer 20B. The other virtual universes (e.g., 12''', 12'''') residing on the other virtual universe clients (e.g., 24C, 24D) on the other user operating computers (e.g., 20C, 20D) can similarly be connected in various combinations. An embodiment is depicted in FIG. 7 that shows multiple (e.g., two) external virtual universes (e.g., 12', 12") being attached to an existing virtual universe 12. Additionally, instead of permanent coordinates assigned by the VU grid for each component world 12', there may be an area of dynamically allocated coordinates that are used to dock components worlds 12' while they are attached, but reused the coordinates when the component world(s) 12' detach. As an example, a rendering that looks like a hallway with rooms or gates at an airport, where each room's door will be dynamically allocated to each attached component world 12'. Clearly, the rendering of the attachment and/or detachment means can take on a near infinite variety of manifestations. For example, the rendering may be a series of doors, an elevator with a plurality of buttons, signage referring to various available component world(s) 12' for attachment, and/or the like. FIGS. 8 and 9 depict examples of this type of embodiment, wherein each virtual region 18 is shown. Further, an indicia 92 (e.g., traffic light, etc.) can indicate whether a particular external virtual universe (e.g., virtual region 18) is attached, or detached. For example, FIG. 8 has a virtual region 18B that is in the process of being attached, as a lit traffic light 92 indicates. Similarly, virtual region 18A is in the processed of becoming detached, as an indicator 92 with an "X" indicates. Other embodiments are available under the present invention wherein any type of indicia 92 (e.g., text, sound, color, avatar, signage, etc.) is available in a region 90 that allows a resident to determine whether a particular external virtual universe 12' is available (i.e., attached) or not (i.e., detached). In another embodiment, instead of an indicia 92 (e.g., sign) to communicate that an external virtual universe 12' is detached, a "ghost" of the external virtual universe 12' that remains behind, which may be implemented technically as the basic geometries of the external virtual universe 12' being retained in the VU grid's database.

In another embodiment of this invention, the universe attachment tool 53 is used as a service to charge fees for each user, or group of users, that attach (and detach) an external universe to an existing virtual universe 12 and/or travel there between. In this embodiment, the provider of the virtual universe or a third party service provider could offer this universe attachment tool 53 as a service by performing the functionalities described herein on a subscription and/or fee basis. In this case, the provider of the virtual universe or the third party service provider can create, deploy, maintain, support, etc., the universe attachment tool 53 that performs the processes described in the disclosure. In return, the virtual universe or the third party service provider can receive payment from the virtual universe residents via the universe economy management component 70 and the commercial transaction management component 72.

In still another embodiment, the methodologies disclosed herein can be used within a computer system to provide for the attachment (and detachment) of an external universe to an existing virtual universe 12. In this case, the universe attachment tool 53 can be provided and one or more systems for performing the processes described in the disclosure can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the disclosure.

Figure 10:
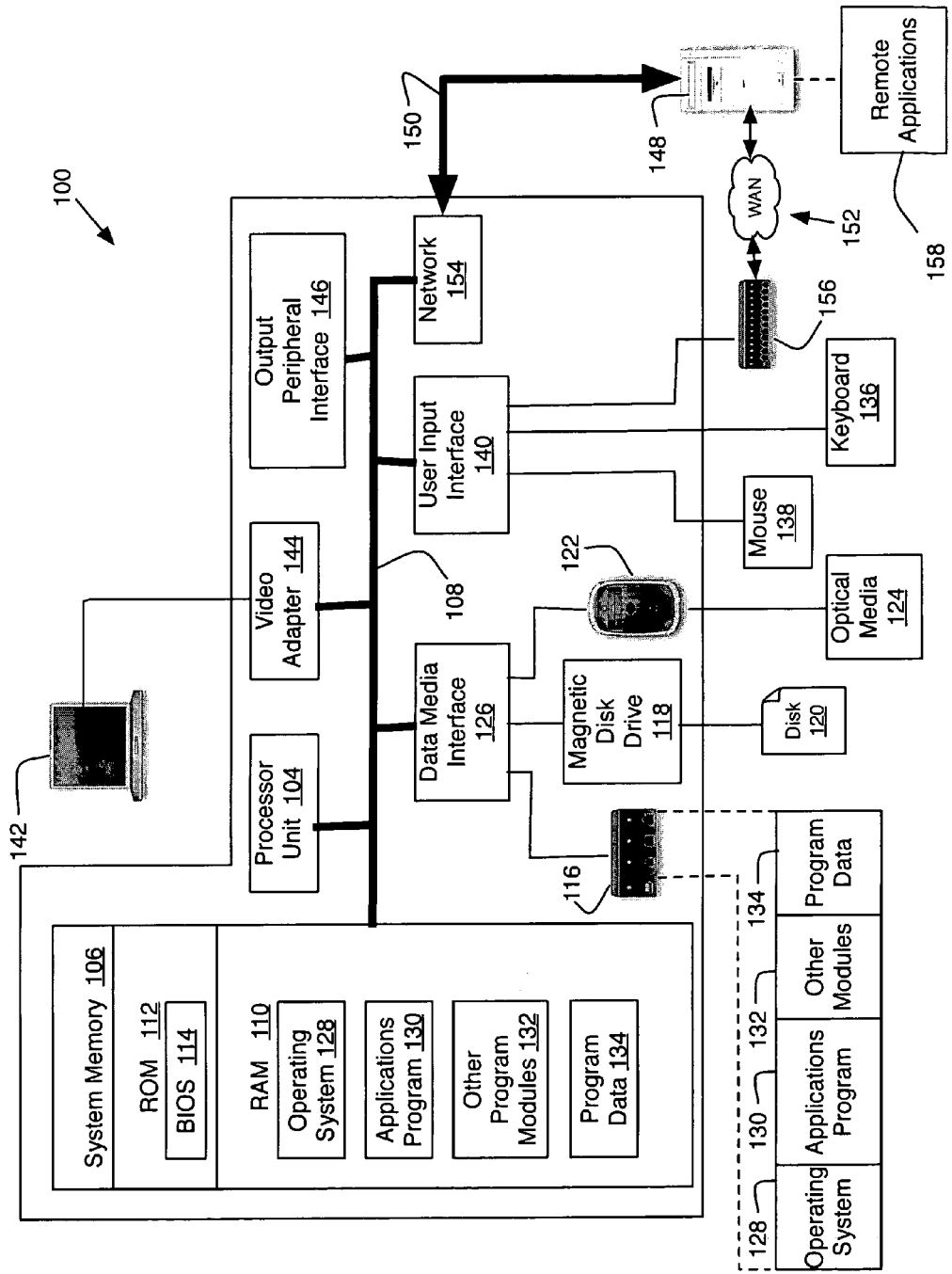
FIG. 10 depicts an illustrative computer system for implementing embodiment(s) of the present invention.

FIG. 10 shows a schematic of an exemplary computing environment in which elements of the networking environment shown in FIGS. 6A and/or 6B may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 10.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable customer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 10, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 10, the system memory 106 includes computer readable media in the form of volatile memory, such as random access memory (RAM) 100, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 10 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130, other program modules 132, and program data 134 or some combination thereof, may include an implementation of the networking environment 10 of FIGS. 6A and/or 6B including the server array 14, the virtual universe client 24 and the universe attachment tool 53.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 10 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 10 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this disclosure an approach for providing for the attachment (and detachment) of an external universe to an existing virtual universe. While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for enhancing a preexisting virtual universe in a first computerized system comprising:
   creating an external virtual universe in a second computerized system, wherein the external virtual universe is configured to be attachable to the preexisting virtual universe in the first computerized system;
   assigning boundary coordinates of the external virtual universe to coordinates within the preexisting virtual universe;
   receiving a user request to enter modification mode, and in response, presenting a modification mode to the user, the modification mode comprising a user interface to include at least one user-specified texture for an object;
   receiving at least one modification from the user, and storing the modification to a database local to the second computerized system, wherein the least one modification comprises a user-specified texture;
   parsing the least one modification for business logic to apply rules of the preexisting virtual universe;
   attaching the second computerized system to the preexisting virtual universe, and in response, synchronizing the external virtual universe to the preexisting virtual universe; and
   rendering the user-specified texture for an object only to at least one machine on a local area network to which the second computerized system is attached, wherein the second computerized system can be the at least one machine, and wherein the first computerized system is not on the local area network.

2. The method of claim 1, wherein at least one of the first computerized system and the second computerized system is a personal computer.

3. The method of claim 1, the providing further comprising providing an editing interface of the external virtual universe.

4. The method of claim 1, further comprising providing in the preexisting virtual universe a detection interface configured to recognize whether the external virtual universe is attached or detached to the preexisting virtual universe.

5. The method of claim 1, further comprising:
   providing a second external virtual universe in a third computerized system, wherein the second external virtual universe is configured to be attachable to the external virtual universe in the second computerized system.

6. The method of claim 1, wherein one of the external universe and the preexisting virtual universe is a social networking site.

7. A computer program product for enhancing a preexisting virtual universe in a first computerized system, the computer program product comprising:
   one or more computer-readable storage devices;
   program instructions, stored on at least one of the one or more storage devices, for creating an external virtual universe in a second computerized system, wherein the external virtual universe is configured to be attachable to the preexisting virtual universe in the first computerized system;
   program instructions, stored on at least one of the one or more storage devices, for assigning boundary coordinates of the external virtual universe to coordinates within the preexisting virtual universe;
   program instructions, stored on at least one of the one or more storage devices, for receiving a user request to enter modification mode, and in response, presenting a modification mode to the user, the modification mode comprising a user interface to include at least one user-specified texture for an object;
   program instructions, stored on at least one of the one or more storage devices, for receiving at least one modification from the user, and storing the modification to a database local to the second computerized system, wherein the least one modification comprises a user-specified texture;
   program instructions, stored on at least one of the one or more storage devices, for parsing the least one modification for business logic to apply rules of the preexisting virtual universe;
   program instructions, stored on at least one of the one or more storage devices, for attaching the second computerized system to the preexisting virtual universe, and in response, synchronizing the external virtual universe to the preexisting virtual universe; and
   program instructions, stored on at least one of the one or more storage devices, for rendering the user-specified texture for an object only to at least one machine on a local area network to which the second computerized system is attached, wherein the second computerized system can be the at least one machine, and wherein the first computerized system is not on the local area network.

8. The computer program product of claim 7, further comprising:
   program instructions, stored on at least one of the one or more storage devices, for rendering an access to the external virtual universe in a graphical user interface (GUI), wherein the access includes an indicia of detachment of the external virtual universe comprising a text.

9. The computer program product of claim 7, further comprising:
   program instructions, stored on at least one of the one or more storage devices, for rendering an access to the external virtual universe in a graphical user interface (GUI), wherein rendering the access comprises rending a traffic light while attaching the external virtual universe to the preexisting virtual universe.

10. The computer program product of claim 7, further comprising:
    program instructions, stored on at least one of the one or more storage devices, for providing a second external virtual universe in a third computerized system, wherein the second external virtual universe is configured to be attachable to the external virtual universe in the second computerized system.

11. The computer program product of claim 7, wherein one of the external universe and the preexisting virtual universe is a social networking site.

12. A business method for enhancing a preexisting virtual universe in a first computerized system, the business method comprising:
    managing a network that includes at least one computer system that performs a method, the method comprising:
    creating an external virtual universe in a second computerized system, wherein the external virtual universe is configured to be attachable to the preexisting virtual universe in the first computerized system;
assigning boundary coordinates of the external virtual universe to coordinates within the preexisting virtual universe;
receiving a user request to enter modification mode, and in response, presenting a modification mode to the user, the modification mode comprising a user interface to include at least one user-specified texture for an object;
receiving at least one modification from the user, and storing the modification to a database local to the second computerized system, wherein the least one modification comprises a user-specified texture;
parsing the least one modification for business logic to apply rules of the preexisting virtual universe;
attaching the second computerized system to the preexisting virtual universe, and in response, synchronizing the external virtual universe to the preexisting virtual universe;
rendering the user-specified texture for an object only to at least one machine on a local area network to which the second computerized system is attached, wherein the second computerized system can be the at least one machine, and wherein the first computerized system is not on the local area network; and
receiving payment based on the managing.

* * * * *